(12) United States Patent
He et al.

(10) Patent No.: US 9,017,639 B2
(45) Date of Patent: Apr. 28, 2015

(54) METHOD FOR MAKING GRAPHENE

(75) Inventors: Xiang-Ming He, Beijing (CN); Li Wang, Beijing (CN); Jian-Jun Li, Beijing (CN); Jian-Wei Guo, Beijing (CN); Wen-Ting Sun, Beijing (CN); Jian-Guo Ren, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 90 days.

(21) Appl. No.: 13/554,127

(22) Filed: Jul. 20, 2012

(65) Prior Publication Data

US 2013/0171055 A1     Jul. 4, 2013

(30) Foreign Application Priority Data

Dec. 28, 2011 (CN) .......................... 2011 1 0447129

(51) Int. Cl.
| | |
|---|---|
| *C01B 31/02* | (2006.01) |
| *B82Y 40/00* | (2011.01) |
| *B82Y 30/00* | (2011.01) |
| *C01B 31/04* | (2006.01) |
| *C25B 1/00* | (2006.01) |
| *H01M 4/587* | (2010.01) |

(52) U.S. Cl.
CPC .............. *C01B 31/0469* (2013.01); *B82Y 30/00* (2013.01); *B82Y 40/00* (2013.01); *C25B 1/00* (2013.01); *H01M 4/587* (2013.01)

(58) Field of Classification Search
CPC  C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32

USPC ......................................................... 423/448
See application file for complete search history.

(56) References Cited

U.S. PATENT DOCUMENTS 5,554,462 A * 9/1996 Flandrois et al. .......... 429/231.8

FOREIGN PATENT DOCUMENTS

| | | |
|---|---|---|
| CN | 101857221 | 10/2010 |
| CN | 102263265 | 11/2011 |
| JP | 9293538 | 11/1997 |
| TW | 200613219 | 5/2006 |

OTHER PUBLICATIONS

Scientific Background on the Nobel Prize in Physics 2010, The Royal Swedish Academy of Sciences (Oct. 5, 2010).*
H.F.Xiang et al., Graphitic platelets prepared by electrochemical exfoliation of graphite and their application for Li energy storage, Electrochimica Acta, Available online Apr. 9, 2011, vol. 56, p. 5322-5327.

* cited by examiner

*Primary Examiner* — Daniel C McCracken
(74) *Attorney, Agent, or Firm* — Novak Druce Connolly Bove + Quigg LLP

(57) ABSTRACT

In the method for making graphene, an electrolyte solution is formed by dissolving an electrolyte lithium salt in an organic solvent. Lithium ions are separated out from the electrolyte lithium salt in the electrolyte solution. Metal lithium and graphite are disposed in the electrolyte solution, and the metal lithium and the graphite are in contact with each other. In the electrolyte solution, lithium ions and organic solvent molecules jointly insert between adjacent layers of the graphite to form a graphite intercalation compound. The graphene is peeled off from the graphite intercalation compound.

14 Claims, 2 Drawing Sheets

METHOD FOR MAKING GRAPHENE

This application claims all benefits accruing under 35 U.S.C. §119 from China Patent Application No. 201110447129.3, filed on Dec. 28, 2011, in the China Intellectual Property Office, the contents of which are hereby incorporated by reference.

BACKGROUND

1. Technical Field

The present disclosure relates to a method for making graphene.

2. Description of Related Art

Graphene is a carbonaceous material composed of $sp^2$ bonded carbon atoms that are densely packed in a two dimensional honeycomb crystal lattice. Graphene has excellent electrical and thermal properties.

Graphene can be commonly made by thermal expansion method, reduction method, chemical vapor deposition method, and crystal epitaxy growth method. Even if a large quantity of graphene can be fabricated by the thermal expansion method and the reduction method, the electronic structure and crystal perfection of the graphene can be destroyed by a strong oxidizing agent. In addition, the cost of a continuous graphene sheet having a large area and excellent properties fabricated by the chemical vapor deposition method and crystal epitaxy growth method is high.

What is needed, therefore, is to provide a method for making graphene, which does not destroy the electronic structure and crystal perfection of the graphene, and has a low cost.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

Figure 1:
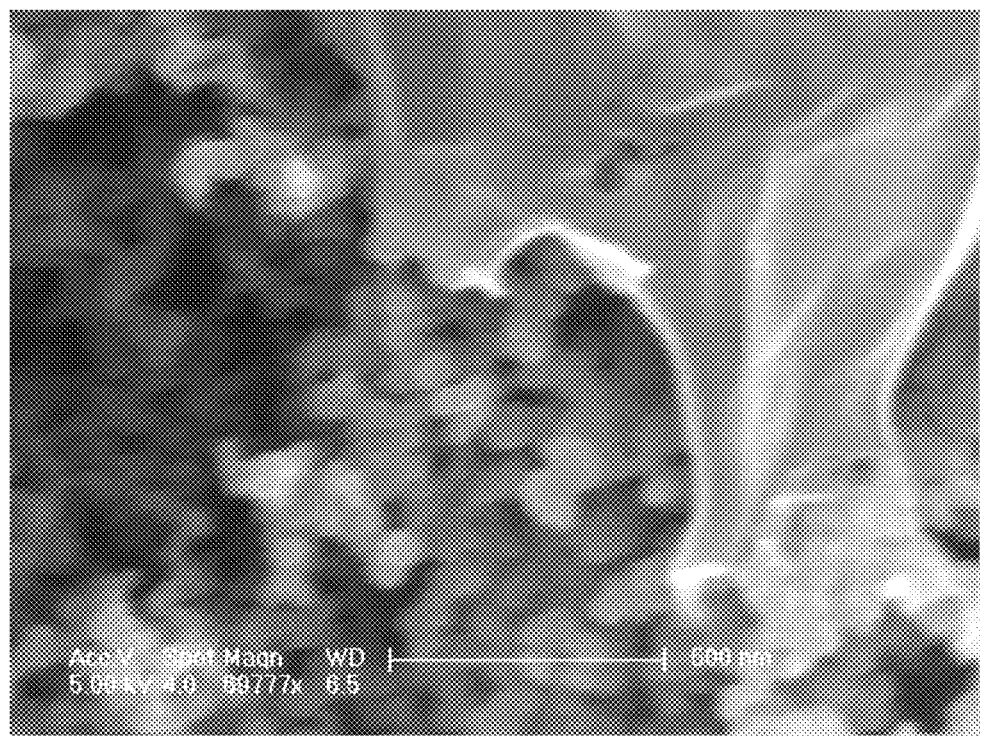
FIGS. 1 and 2 are scanning electron microscopic (SEM) images of graphene made by one embodiment of a method for making graphene.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

One embodiment of a method for making graphene includes:

S1, forming an electrolyte solution by dissolving an electrolyte lithium salt in an organic solvent, wherein lithium ions are separated out from the electrolyte lithium salt in the electrolyte solution;

S2, disposing metal lithium and graphite in the electrolyte solution, wherein the metal lithium and the graphite are in contact with each other, the lithium ions and organic solvent molecules jointly inserting between adjacent layers of the graphite to form a graphite intercalation compound; and S3, peeling off graphene from the graphite intercalation compound.

In the step S1, the electrolyte solution can be the current electrolyte solution used in lithium ion battery. The electrolyte lithium salt can dissolve in the organic solvent and can separate out lithium ions in the organic solvent. The electrolyte lithium salt can be lithium chlorate, lithium nitrate, lithium chloride, lithium acetate, lithium hexafluorophosphate, lithium bis(oxalato)borate, lithium tetrafluoroborate, or lithium trifluoromethanesulfonate.

The organic solvent can dissolve the electrolyte lithium salt but does not react with the metal lithium. The organic solvent can be propene carbonate (PC), tetrahydrofuran (THF), 1,2-Dimethoxyethane (DME), 1,2-Diethoxyethane (DEE), 1,2-Dibutoxyethane (DBE), dimethoxymethane (DMM), diethoxymethane (DEM), or any combination thereof.

A quantity of the organic solvent is not limited. The organic solvent must be sufficient to completely dissolve the electrolyte lithium salt and completely immerse the metal lithium and the graphite.

A molar concentration of the electrolyte lithium salt in the electrolyte solution is not limited. The molar concentration of the electrolyte lithium salt can be less than or equal to a saturated concentration of the electrolyte lithium salt in the electrolyte solution, and can be in a range from about 0.1 mol/L to about 100 mol/L. In one embodiment, the molar concentration of the electrolyte lithium salt in the electrolyte solution is in a range from about 0.05 mol/L to about 20 mol/L.

In the step S2, the metal lithium can be a sheet, a scrap, a block, or in a powder form. The graphite can be electrographite, natural flake graphite, pyrolysis graphite, or expandable graphite. In one embodiment, the graphite is natural flake graphite. The graphite can be in a form of powder or particle. A particle diameter of the graphite can be in a range from about 0.05 microns to about 1000 microns. The smaller a diameter of the metal lithium, the larger a contact area between the metal lithium and the graphite.

The graphite has an excellent interlayer structure. A distance between adjacent crystal planes can be about 0.1335 nanometers. In the electrolyte solution, the lithium ions can be combined with the organic solvent molecules to form solvated lithium ions by ionic solvation. An electric potential difference can be formed by the contact between the metal lithium and the graphite in the electrolyte solution, thereby inducing an electrochemical reaction. In the electrochemical reaction, the metal lithium can form lithium ions in the electrolyte solution, and the formed lithium ions can combine with the organic solvent molecules to form solvated lithium ions by ionic solvation. The solvated lithium ions can insert between the graphite layers, thereby forming a graphite intercalation compound. The distance between the adjacent crystal planes of the graphite with the insertion of the solvated lithium ions is larger than the distance between the adjacent crystal planes of the graphite without the insertion of the solvated lithium ions. Thus, a bonding force between the graphite layers becomes poor, and the graphite layer is easily peeled off to form graphene. In the process of forming the graphite intercalation compound, the graphite does not need to be oxidized.

Furthermore, the electrolyte solution with the metal lithium and the graphite can be further agitated, thereby uniformly mixing the metal lithium and the graphite in the electrolyte solution. The agitating mode is not limited and can be mechanical agitation, magnetic agitation, or supersonic dispersion.

The electrolyte solution with the metal lithium and the graphite can be further heated to speed up the electrochemical reaction. The electrolyte solution can be heated under constant pressure or high pressure. In one embodiment, the electrolyte solution is heated under high pressure. The electrolyte solution with the metal lithium and the graphite is disposed in a closed pressure reactor and heated for a predetermined period under a predetermined temperature. The predetermined temperature can be in a range from about 150° C. to about 300° C. The predetermined period can be in a range from about 30 minutes to about 40 hours.

In the step S3, the distance between the adjacent layers of the graphite intercalation compound is larger than the distance between the adjacent layers of the graphite. Thus, the graphene layers of the graphite intercalation compound can easily peel off from the graphite intercalation compound. A peeling mode of the graphene is not limited and can be by a supersonic dispersing method, ball milling method, or magnetic mixing method. In one embodiment, the graphene is peeled off from the graphite intercalation compound by supersonic dispersing the graphite intercalation compound in a liquid medium. The liquid medium can be the same as the organic solvent for dissolving the electrolyte lithium salt, water, or other organic solvent having a low molecular weight such as ethanol, diethyl ether, or acetone. The adjacent layers of the graphite intercalation compound are separated from each other to form graphene suspending and dispersing in the liquid medium by the supersonic dispersing method. A power of the supersonic dispersing method can be larger than or equal to about 100 watt. A dispersing period of the supersonic dispersing method can be in a range from about 5 minutes to about 400 minutes.

In addition, the graphene can be further filtered out from the liquid medium, and can be washed and dried. In one embodiment, the electrolyte lithium salt, metal lithium, and solvent can be removed by centrifugal separation method or filtration method. The remaining graphene can be dried. The drying mode can be freeze drying method, supercritical fluid drying method, natural drying method, or baking method.

The above method for making the graphene is simple and low in cost, thereby easily realizing an industrial production of the graphene. In addition, an oxidizing agent is not needed, thus the electronic structure and crystal perfection of the graphene are preserved.

EXAMPLE 1

Figure 2:
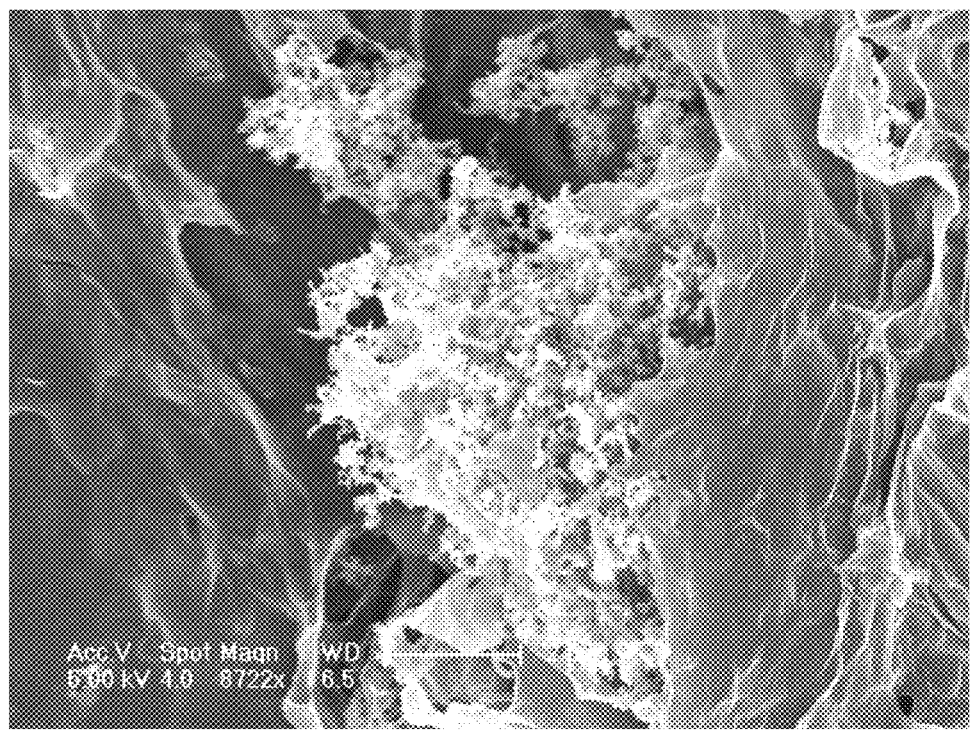

The lithium chlorate is dissolved in the PC to form the electrolyte solution. The molar concentration of the electrolyte solution is about 1.5 mol/L. The natural flake graphite having the particle diameter of 1 micron, the metal lithium having the powder form and the electrolyte solution are mixed together to form a mixture liquid. The mixture liquid is then heated to about 190° C. under high pressure in the reactor. The heating period is 1 hour. The metal lithium and the graphite are reacted with each other by heating to form the graphite intercalation compound. The graphite intercalation compound is supersonic dispersed to form the graphene suspended in the electrolyte solution. The dispersing power is about 1500 watt. The dispersing period is about 40 minutes. The graphene suspending in the electrolyte solution can then be separated out by centrifugal separation method. The separated graphene is dried by natural drying. Referring to FIGS. 1 and 2, the SEM image of the graphene is shown.

EXAMPLE 2

The lithium chlorate is dissolved in the THF to form the electrolyte solution. The molar concentration of the electrolyte solution is about 0.5 mol/L. The natural flake graphite with a particle diameter of about 8 microns, the metal lithium in powder form, and the electrolyte solution are mixed together to form a mixture liquid. The mixture liquid is then heated to about 200° C. under high pressure in the hydrothermal reactor. The heating period is about 1.5 hours. The metal lithium and the graphite react with each other with heat to form the graphite intercalation compound. The graphite intercalation compound is supersonic dispersed to form the graphene suspended in the electrolyte solution. The dispersing power is about 600 watts. The dispersing period is about 120 minutes. The graphene suspended in the electrolyte solution can be separated out by a centrifugal separation method. The separated graphene is dried by a natural drying method.

EXAMPLE 3

The lithium chlorate is dissolved in the DME to form the electrolyte solution. The molar concentration of the electrolyte solution is about 2 mol/L. The natural flake graphite with a particle diameter of about 50 microns, the metal lithium in powder form, and the electrolyte solution are mixed together to form a mixture liquid. The mixture liquid is then heated to about 300° C. under high pressure in the hydrothermal reactor. The heating period is about 10 hours. The metal lithium and the graphite react with each other with heat to form the graphite intercalation compound. The graphite intercalation compound is supersonic dispersed to form the graphene suspended in the electrolyte solution. The dispersing power is about 250 watts. The dispersing period is about 30 minutes. The graphene suspending in the electrolyte solution can be then separated out by centrifugal separation method. The separated graphene is dried by natural drying.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making graphene, the method comprising:
    forming an electrolyte solution by dissolving an electrolyte lithium salt in an organic solvent, wherein lithium ions are separated out from the electrolyte lithium salt in the electrolyte solution;
    disposing metal lithium and graphite in the electrolyte solution, wherein the metal lithium and the graphite are in contact with each other, thereby the lithium ions and organic solvent molecules from the organic solvent jointly gather between adjacent layers of the graphite to form a graphite intercalation compound; and
    peeling off graphene from the graphite intercalation compound.

2. The method of claim 1, wherein the electrolyte lithium salt is lithium chlorate, lithium nitrate, lithium chloride, lithium acetate, lithium hexafluorophosphate, lithium bis(oxalato) borate, lithium tetrafluoroborate, lithium trifluoromethanesulfonate or any combination thereof.

3. The method of claim 1, wherein the electrolyte lithium salt is dissolvable in the organic solvent and lithium ions of the electrolyte lithium salt is separable in the organic solvent.

4. The method of claim 3, wherein the organic solvent is propene carbonate, tetrahydrofuran, 1,2-Dimethoxyethane, 1,2-Diethoxyethane, 1,2-Dibutoxyethane, dimethoxymethane, diethoxymethane, or any combination thereof.

5. The method of claim 1, wherein a molar concentration of the electrolyte lithium salt is in a range from about 0.1 mol/L to about 100 mol/L.

6. The method of claim 1, wherein the graphite is electrographite, natural flake graphite, pyrolysis graphite, or expandable graphite.

7. The method of claim 1, wherein the electrolyte solution with the metal lithium and the graphite dissolving therein is further heated in a hydrothermal reactor.

8. The method of claim 7, wherein a heating temperature is in a range from about 150° C. to about 300° C.

9. The method of claim 8, wherein a heating period is in a range from about 30 minutes to about 40 hours.

10. The method of claim 1, wherein the graphene is peeled off by supersonic dispersing the graphite intercalation compound.

11. The method of claim 10, wherein a power of the supersonic dispersing method is larger than or equal to about 100 watts, and a dispersing period is in a range from about 5 minutes to about 400 minutes.

12. The method of claim 1, wherein the graphene is separated out by a centrifugal separation method or filtration method after peeling off the graphene.

13. The method of claim 12, wherein the graphene is further dried by a freeze drying method, supercritical fluid drying method, natural drying method, or baking method.

14. A method for making graphene, the method comprising:
forming an electrolyte solution by dissolving an electrolyte lithium salt in an organic solvent, wherein lithium ions are separated out from the electrolyte lithium salt in the electrolyte solution;
mixing metal lithium powder with graphite powder in the electrolyte solution, wherein the metal lithium powder and the graphite powder are in contact with each other, thereby the lithium ions and organic solvent molecules from the organic solvent jointly gather between adjacent layers of graphite to form a graphite intercalation compound; and
peeling off graphene from the graphite intercalation compound.

* * * * *